United States Patent
Chai et al.

(10) Patent No.: US 10,942,811 B2
(45) Date of Patent: Mar. 9, 2021

(54) DATA PROCESSING METHOD FOR SOLID STATE DRIVE

(71) Applicants: Lite-On Electronics (Guangzhou) Limited, Guangzhou (CN); LITE-ON TECHNOLOGY CORPORATION, Taipei (TW)

(72) Inventors: Fang-Chien Chai, Taipei (TW); Ho-An Lin, Taipei (TW)

(73) Assignee: SOLID STATE STORAGE TECHNOLOGY CORPORATION, Taipei (TW)

(*) Notice: Subject to any disclaimer, the term of this patent is extended or adjusted under 35 U.S.C. 154(b) by 138 days.

(21) Appl. No.: 16/278,793

(22) Filed: Feb. 19, 2019

(65) Prior Publication Data

US 2020/0167235 A1 May 28, 2020

(30) Foreign Application Priority Data

Nov. 27, 2018 (CN) .......................... 201811426938.4

(51) Int. Cl.
*G06F 11/14* (2006.01)
*G06F 12/02* (2006.01)
*G06F 3/06* (2006.01)
*G06F 12/1009* (2016.01)

(52) U.S. Cl.
CPC .......... *G06F 11/1441* (2013.01); *G06F 3/064* (2013.01); *G06F 3/0619* (2013.01); *G06F 3/0659* (2013.01); *G06F 3/0679* (2013.01); *G06F 11/1469* (2013.01); *G06F 12/0246* (2013.01); *G06F 2212/7201* (2013.01); *G06F 2212/7205* (2013.01); *G06F 2212/7207* (2013.01)

(58) Field of Classification Search
None
See application file for complete search history.

(56) References Cited

U.S. PATENT DOCUMENTS

2019/0034287 A1* 1/2019 Hsieh ....................... G06F 3/064
2019/0087348 A1* 3/2019 Liao .................... G06F 12/1009

* cited by examiner

*Primary Examiner* — Michael Alsip
(74) *Attorney, Agent, or Firm* — WPAT, PC

(57) ABSTRACT

A data processing method for a solid state drive includes the following steps. When a write command is received, the write command is executed to store a write data into a first number of blocks of the plural blocks, a block-closing action is performed to generate a first number of used blocks, and the logical-to-physical table is updated. When a trim command is received, the trim command is executed to change a second number of used blocks to a second number of unused blocks, a physical-to-logical data corresponding to the second number of used blocks is stored into a trim block of the non-volatile memory, and the logical-to-physical table is updated. A backup action is performed at plural time points to generate plural backup contents corresponding to the plural time points, respectively. The plural backup contents are stored into the non-volatile memory.

4 Claims, 17 Drawing Sheets

DATA PROCESSING METHOD FOR SOLID STATE DRIVE

This application claims the benefit of People's Republic of China Patent Application No. 201811426938.4, filed Nov. 27, 2018, the subject matter of which is incorporated herein by reference.

FIELD OF THE INVENTION

The present invention relates to a data processing method for a solid state drive, and more particularly to a method for processing data of a solid state drive according to a trim command and a method for rebuilding a logical-to-physical table of the solid state drive.

BACKGROUND OF THE INVENTION

As is well known, a solid state drive (SSD) is a data storage device that uses a non-volatile memory to store data. After data are written to the non-volatile memory, when no electric power is supplied to the non-volatile memory, the data are still retained in the solid state drive.

FIG. 1 is a schematic functional block diagram illustrating the architecture of a conventional solid state drive. As shown in FIG. 1, the solid state drive 10 comprises a control circuit 101 and a non-volatile memory 105. The non-volatile memory 105 is a NAND flash memory. Moreover, the non-volatile memory 105 comprises plural blocks Block_0, Block_1, . . . , and so on. One of the plural blocks is configured as a backup block _PBT for storing a partial build table (also referred as a PBT table). Moreover, the partial build table is also referred as a quick build table (also referred as a QBT table).

The control circuit 101 is in communication with a host 12 through an external bus 20. Consequently, commands and data can be exchanged between the control circuit 101 and the host 12. For example, the external bus 20 is a USB bus, an SATA bus, a PCIe bus, an M.2 bus, a U.2 bus, or the like.

In the solid state drive 10, the control circuit 101 is connected with the non-volatile memory 105 through an internal bus. According to a write command from the host 12, a write data from the host 12 is stored into the non-volatile memory 105 by the control circuit 101. Alternatively, according to a read command from the host 12, the control circuit 101 acquires a read data from the non-volatile memory 105 and transmits the read data to the host 12.

The control circuit 101 further comprises a logical-to-physical table 107. The logical-to-physical table 107 is also referred as a L2P table. The control circuit 101 can manage the data in the non-volatile memory 105 through the L2P table 107.

For updating the L2P table 107 in real time, the L2P table 107 is usually stored in a volatile memory. For example, the contents of the L2P table 107 are stored in a static random access memory (SRAM) or a dynamic random access memory (DRAM) that is included in the control circuit 101. Alternatively, the contents of the L2P table 107 are stored in a dynamic random access memory (DRAM) that is disposed outside the control circuit 101.

As mentioned above, the L2P table 107 is stored in a volatile memory. Consequently, when the solid state drive 10 is powered off, the contents of the L2P table 107 are lost. Before the solid state drive 10 is powered off, the control circuit 101 has to store the contents of the L2P table 107 into a specified location of the non-volatile memory 105. After the solid state drive 10 is powered off, the contents of the L2P table 107 in the control circuit 101 are lost but the contents of the L2P table 107 in the non-volatile memory 105 are still retained.

When the solid state drive 10 is powered on again, the contents of the L2P table 107 recorded in the specified location of the non-volatile memory 105 has to be loaded into the control circuit 101. After the contents of the L2P table 107 are loaded into the control circuit 101 successfully, the control circuit 101 can be operated normally.

If the electric power supplied to the solid state drive 10 is interrupted suddenly (i.e., a sudden power off event occurs) when the solid state drive 10 is in a working state, the contents of the L2P table 107 are lost. For solving this problem, the control circuit 101 performs a backup action when the solid state drive 10 is in the working state. Consequently, the contents of the L2P table 107 are updated and stored into the backup block Block_PBT of the non-volatile memory 105.

Moreover, the data stored in the blocks of the non-volatile memory 105 can be deleted according to a trim command from the host 12. Generally, it takes a long time period to erase the stored data in the blocks. Consequently, when the control circuit 101 receives the trim command, the control circuit 101 does not perform an erase action immediately. That is, the data in the blocks are not erased immediately. Instead, the control circuit 101 performs a cancellation action on the L2P table 107. Subsequently, in a proper timing (e.g., a standby period), the control circuit 101 performs the erase action to completely erase the stored data in the blocks.

However, if the electric power supplied to the control circuit 101 is interrupted suddenly when the solid state drive 10 is in the working state, some drawbacks occur. For example, if the trim command has been issued from the host 12 to the control circuit 101 after the backup action is completed and before the sudden power off event occurs, the addresses corresponding to the cancellation action will be lost. Under this circumstance, the L2P table 107 cannot be accurately rebuilt by the control circuit 101.

SUMMARY OF THE INVENTION

An embodiment of the present invention provides a data processing method for a solid state drive. The solid state drive includes a control circuit and a non-volatile memory. The control circuit includes a logical-to-physical table. The non-volatile memory comprising plural blocks. The data processing method includes the following steps. Firstly, a (k-1)-th backup action is performed to acquire a (k-1)-th backup logical-to-physical table content, and the (k-1)-th backup logical-to-physical table content is stored into the non-volatile memory. Then, at least one write command is executed in a (k-1)-th time interval to store a write data into a first number of blocks of the plural blocks, and a block-closing action is performed to generate a first number of used blocks. Then, at least one trim command is executed in the (k-1)-th time interval to change a second number of used blocks to a second number of unused blocks, and a first physical-to-logical data corresponding to the second number of unused blocks is stored into a trim block of the non-volatile memory. Then, a k-th backup action is performed to acquire a k-th backup logical-to-physical table content, and the k-th backup logical-to-physical table content is stored into the non-volatile memory. Then, the at least one write command is executed in a k-th time interval to store the write data into a third number of blocks of the plural blocks, and the block-closing action is performed to generate a third number of used blocks. Then, the at least one trim command is executed in the k-th time interval to change a fourth number of used blocks to a fourth number of unused blocks, and a second physical-to-logical data corresponding to the fourth number of unused blocks is stored into the trim block of the non-volatile memory. Moreover, the control circuit performs the backup action for k times.

Another embodiment of the present invention provides a data processing method for a solid state drive. The solid state drive includes a control circuit and a non-volatile memory. The control circuit includes a logical-to-physical table. The non-volatile memory comprising plural blocks. The data processing method includes the following steps. When a write command is received, the write command is executed to store a write data into a first number of blocks of the plural blocks, a block-closing action is performed to generate a first number of used blocks, and the logical-to-physical table is updated. When a trim command is received, the trim command is executed to change a second number of the used blocks to a second number of unused blocks, a physical-to-logical data corresponding to the second number of unused blocks is stored into a trim block of the non-volatile memory, and the logical-to-physical table is updated. A backup action is performed at plural time points to generate plural backup contents corresponding to the plural time points, respectively. Moreover, the plural backup contents are stored into the non-volatile memory.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
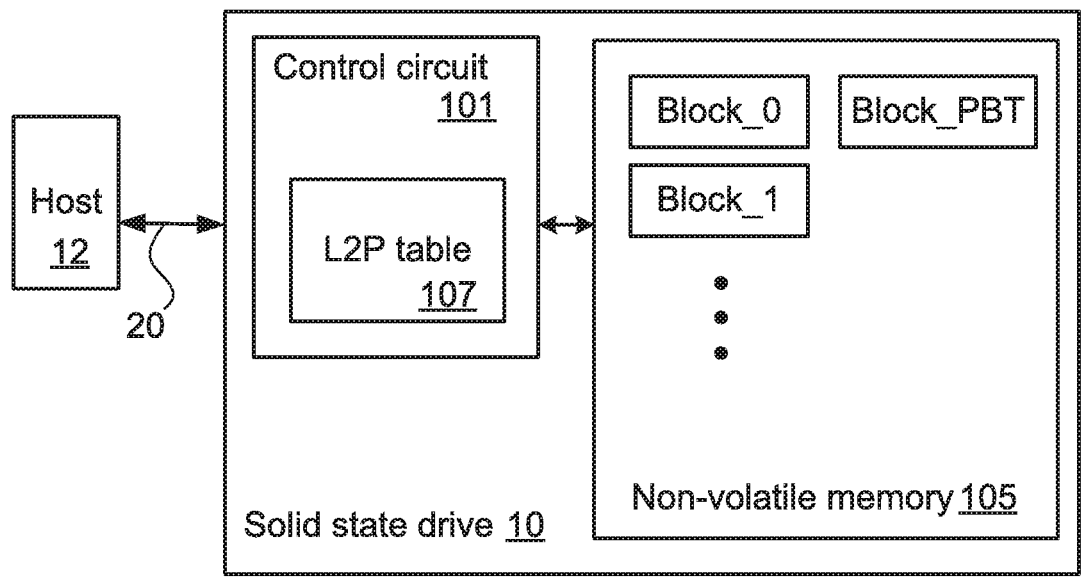
FIG. 1 (prior art) is a schematic functional block diagram illustrating the architecture of a conventional solid state drive.
Figure 2:
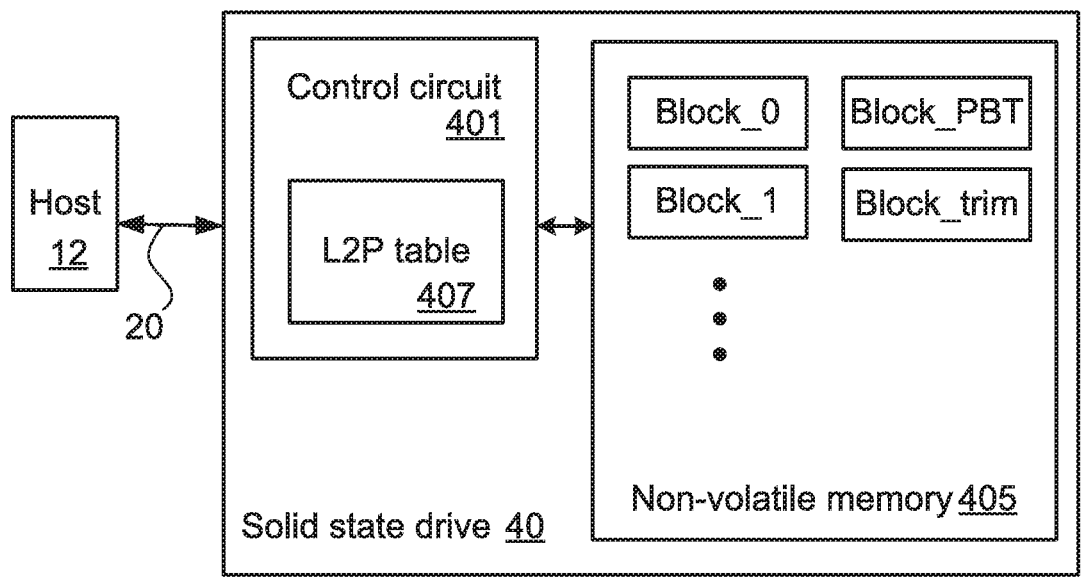
FIG. 2 is a schematic functional block diagram illustrating the architecture of a solid state drive according to an embodiment of the present invention.

FIG. 2 is a schematic functional block diagram illustrating the architecture of a solid state drive according to an embodiment of the present invention. The solid state drive is in communication with a host 12 through an external bus 20. As shown in FIG. 2, the solid state drive 40 comprises a control circuit 401 and a non-volatile memory 405. The non-volatile memory 405 is a NAND flash memory.

The control circuit 401 further comprises a logical-to-physical table 407. The logical-to-physical table 407 is also referred as a L2P table. The control circuit 401 can manage the data in the non-volatile memory 405 through the L2P table 407.

The non-volatile memory 405 comprises plural blocks Block_0, Block_1, . . . , and so on. At least one of the plural blocks is configured as a backup block Block_PBT to store a partial build table. The partial build table is also referred as a PBT table. In addition, at least one of the plural blocks in used as a trim block Block_trim for storing the close information.

Generally, the non-volatile memory 405 comprises plural blocks. Each block comprises plural pages. At least one of the plural pages is defined as an information area for storing the close information. For example, each block has 8 pages, and the storage capacity of each page is 4K bytes. The first page, the second page, the third page, the fourth page, the fifth page, the sixth page and the seventh page are defined as a data area for storing the write data from the host. The eighth page is defined as the information area for storing the close information.

Figure 3A:
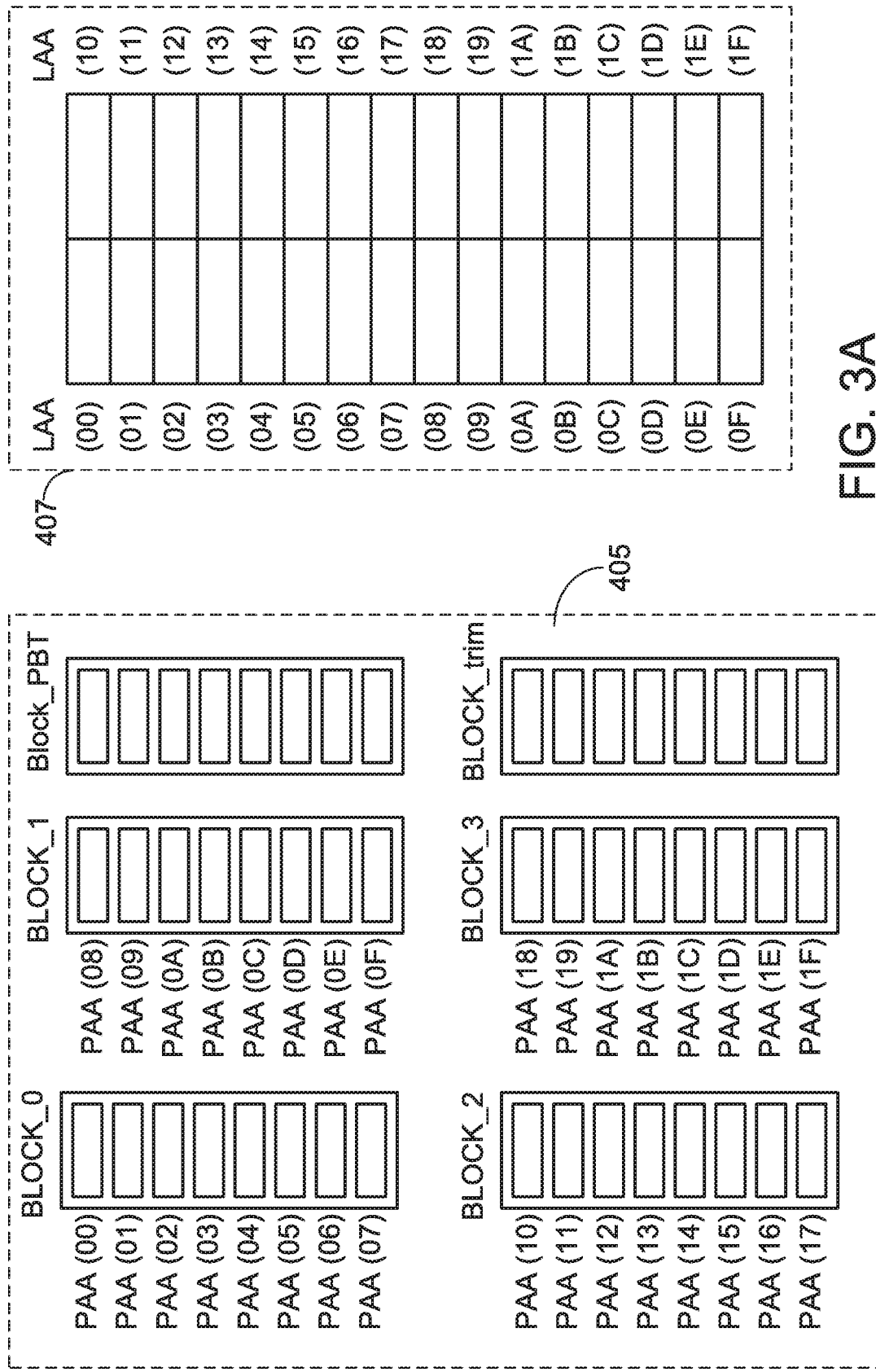
FIGS. 3A~3C schematically illustrate the relationship between the non-volatile memory and the L2P table of the solid state drive in some situations.
Figure 3B:
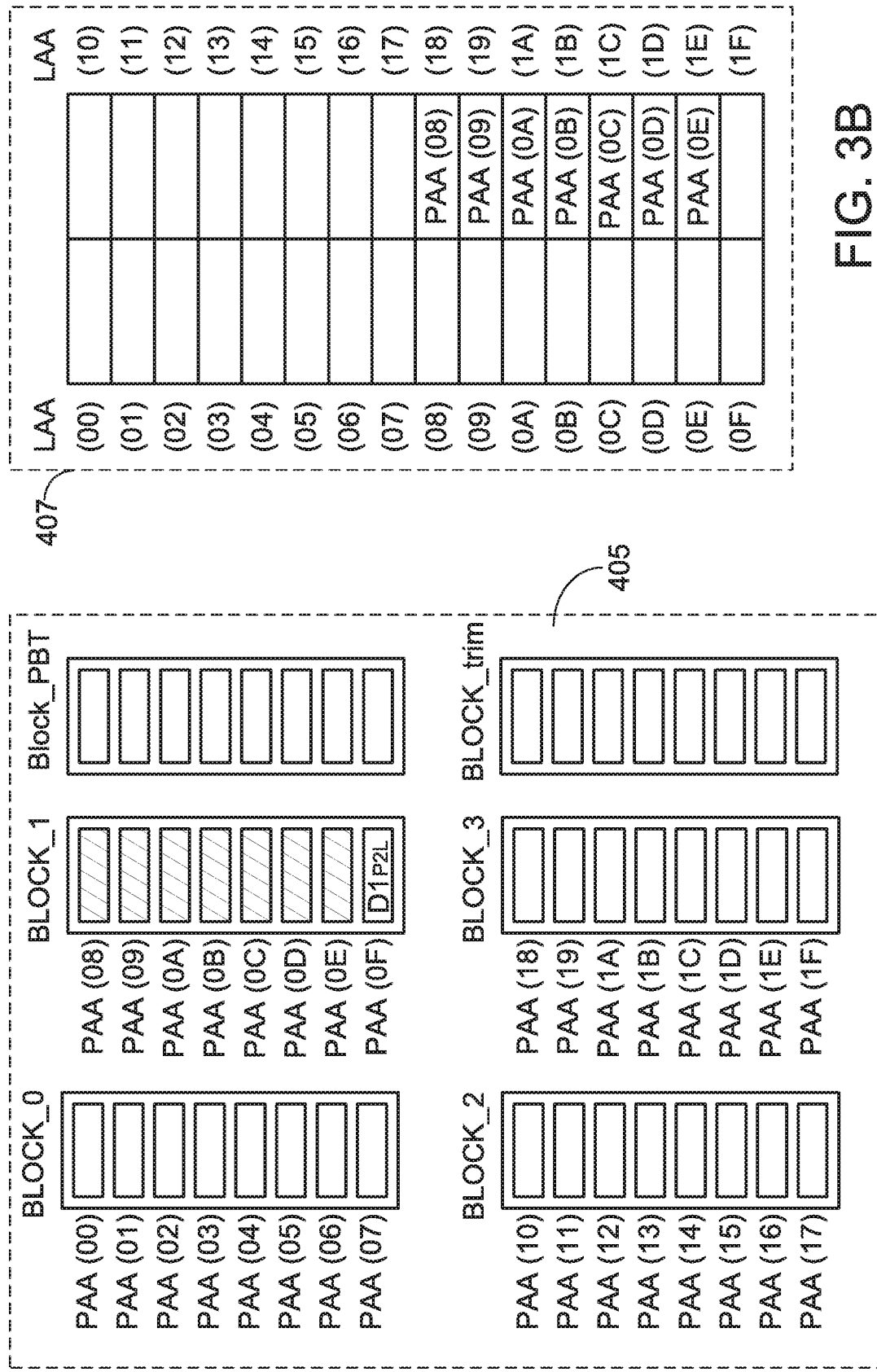
Figure 3C:
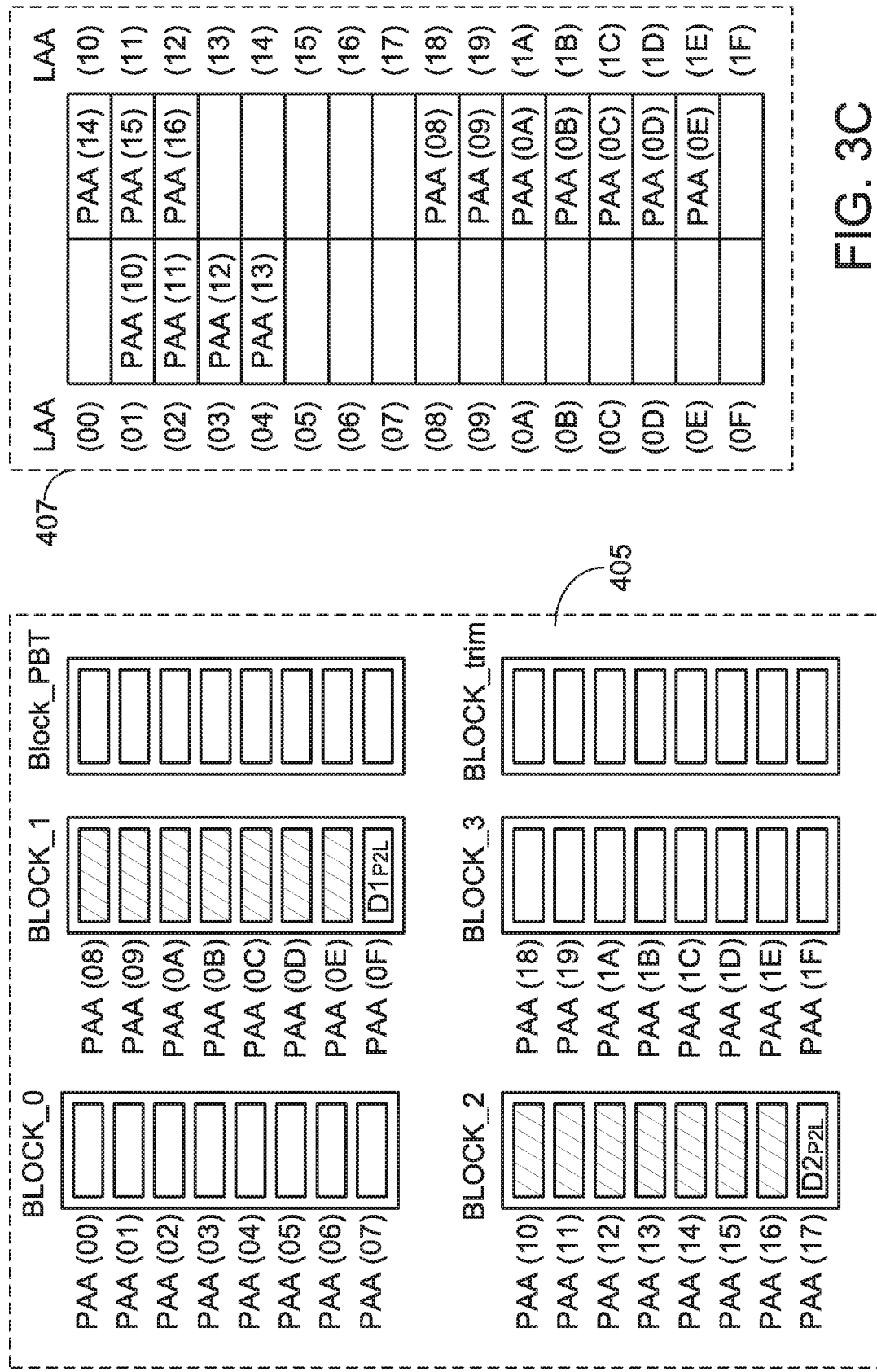

In the L2P table 407, the relationships between the logical allocation addresses (LAA) and the physical allocation addresses (PAA) are recorded. FIGS. 3A~3C schematically illustrate the relationship between the non-volatile memory and the L2P table of the solid state drive in some situations.

Please refer to FIG. 3A. The non-volatile memory 405 comprises six blocks, i.e., Block_PBT, Block_trim, Block_0, Block_1, Block_2 and Block_3. The block Block_PBT is used for storing the PBT table. The block Block_trim is used for storing the close information. The four blocks Block_0~Block_3 are used for storing data. Moreover, each block contains 8 pages corresponding to 8 physical allocation addresses. The 8 pages corresponding to PAA(00)~PAA(07) are included in the zero-th block Block_0. The 8 pages corresponding to PAA(08)~PAA(0F) are included in the first block Block_1. The 8 pages corresponding to PAA(10)~PAA(17) are included in the second block Block_2. The 8 pages corresponding to PAA(18)~PAA(1F) are included in the third block Block_3. Moreover, the storage capacity stored in each PAA is 4 Kbytes, and the storage capacity stored in each LAA is also 4 Kbytes.

As shown in FIG. 3A, no data are stored in the four blocks Block_0~Block_3. That is, all of the four blocks Block_0~Block_3 are free blocks. Meanwhile, no relationships between LAA and PAA are stored in the L2P table 407.

Please refer to FIG. 3B. The host 12 issues a write command in order to store the write data into the locations corresponding to the logical allocation addresses LAA(18), LAA(19), LAA(1A), LAA(16), LAA(1C), LAA(1D) and LAA(1E). By the control circuit 401, the write data are stored into the physical allocation addresses PAA(08), PAA (09), PAA(0A), PAA(0B), PAA(0C), PAA(0D) and PAA(0E) of the first block Block_1 of the free blocks. That is, the write data are stored in the first page to the seventh page of the first block Block_1.

As shown in FIG. 3B, the write data are stored into the physical allocation addresses PAA(08), PAA(09), PAA(0A), PAA(0B), PAA(0C), PAA(0D) and PAA(0E) of the first block Block_1 (i.e., the regions marked with oblique lines). In addition, the relationships between LAA and PAA are stored in the L2P table 407 by the control circuit 401. For example, the L2P table 407 indicates that the write data corresponding to LAA(18) is stored in PAA(08).

Moreover, the last page of the first block Block_1 is the information area for storing the close information. After the data area of the first block Block_1 is occupied, the control circuit 401 performs a block-closing action. Consequently, the close information is stored in the last page of the first block Block_1 by the control circuit 401. The close information at least contains all physical-to-logical data $D1_{P2L}$ (also referred as the P2L-related data) of the first block Block_1. That is, the relationships between all PAAs of the first block Block_1 and the corresponding LAAs are recorded in the last page of the first block Block_1. Moreover, the address relationships of the physical-to-logical data $D1_{P2L}$ in the first block Block_1 are identical to the corresponding address relationships of the L2P table 407. After the block-closing action is completed, the first block Block_1 becomes a used block, and the other three blocks are still free blocks.

Please refer to FIG. 3C. The host 12 issues the write command again in order to store the write data into the locations corresponding to the logical allocation addresses LAA(01), LAA(02), LAA(03), LAA(04), LAA(10), LAA(11) and LAA(12). By the control circuit 401, the write data are stored into the physical allocation addresses PAA(10), PAA(11), PAA(12), PAA(13), PAA(14), PAA(15) and PAA(16) of the second block Block_2 of the free blocks. That is, the write data are stored in the first page to the seventh page of the second block Block_2.

As shown in FIG. 3C, the write data are stored into the physical allocation addresses PAA(10), PAA(11), PAA(12), PAA(13), PAA(14), PAA(15) and PAA(16) of the second block Block_2 (i.e., the regions marked with oblique lines). In addition, the relationships between LAAs and PAAs are stored in the L2P table 407 by the control circuit 401.

After the data area of the second block Block_2 is occupied, the control circuit 401 performs the block-closing action. The physical-to-logical data $D2_{P2L}$ of the second block Block_2 (i.e., the relationships between all PAAs of the second block Block_2 and the corresponding LAAs) are recorded in the last page (i.e., the information area) of the second block Block_2. After the block-closing action is completed, the second block Block_2 becomes a used block.

As mentioned above, while the control circuit 401 executes the write command, the control circuit 401 updates the contents of the L2P table 407. Consequently, the control circuit 401 realizes the relationships between all data of the non-volatile memory 405 according to the contents of the L2P table 407.

For example, when the host 12 issues a read command to read the data from the logical allocation address LAA(18), the control circuit 401 confirms that the data is stored in the physical allocation address PAA(08) according to the L2P table 407. Consequently, the control circuit 401 reads the data stored in the physical allocation address PAA(08) of the first block Block_1 and transmits the data to the host 12.

If the electric power supplied to the solid state drive 40 is interrupted suddenly, the contents of the L2P table 407 will be lost. For solving this problem, the control circuit 401 performs a backup action when the solid state drive 40 is in the working state. In addition, the updated contents of the L2P table 407 are stored into the backup block Block_PBT of the non-volatile memory 405. For example, when the data amount of the write data reaches a specified data amount, the control circuit 401 performs the backup action. Consequently, the contents of the L2P table 407 are stored into the backup block Block_PBT of the non-volatile memory 405.

FIGS. 3D~3H schematically illustrate a method of performing a sudden power off and recovery (SPOR) action to rebuild the L2P table of the solid state drive.

As mentioned in FIG. 3C, when the data amount of the write data reaches a specified data amount, the control circuit 401 performs the backup action. Consequently, the contents of the L2P table 407 are stored into the backup block Block_PBT of the non-volatile memory 405 (see FIG. 3D).

Figure 3D:
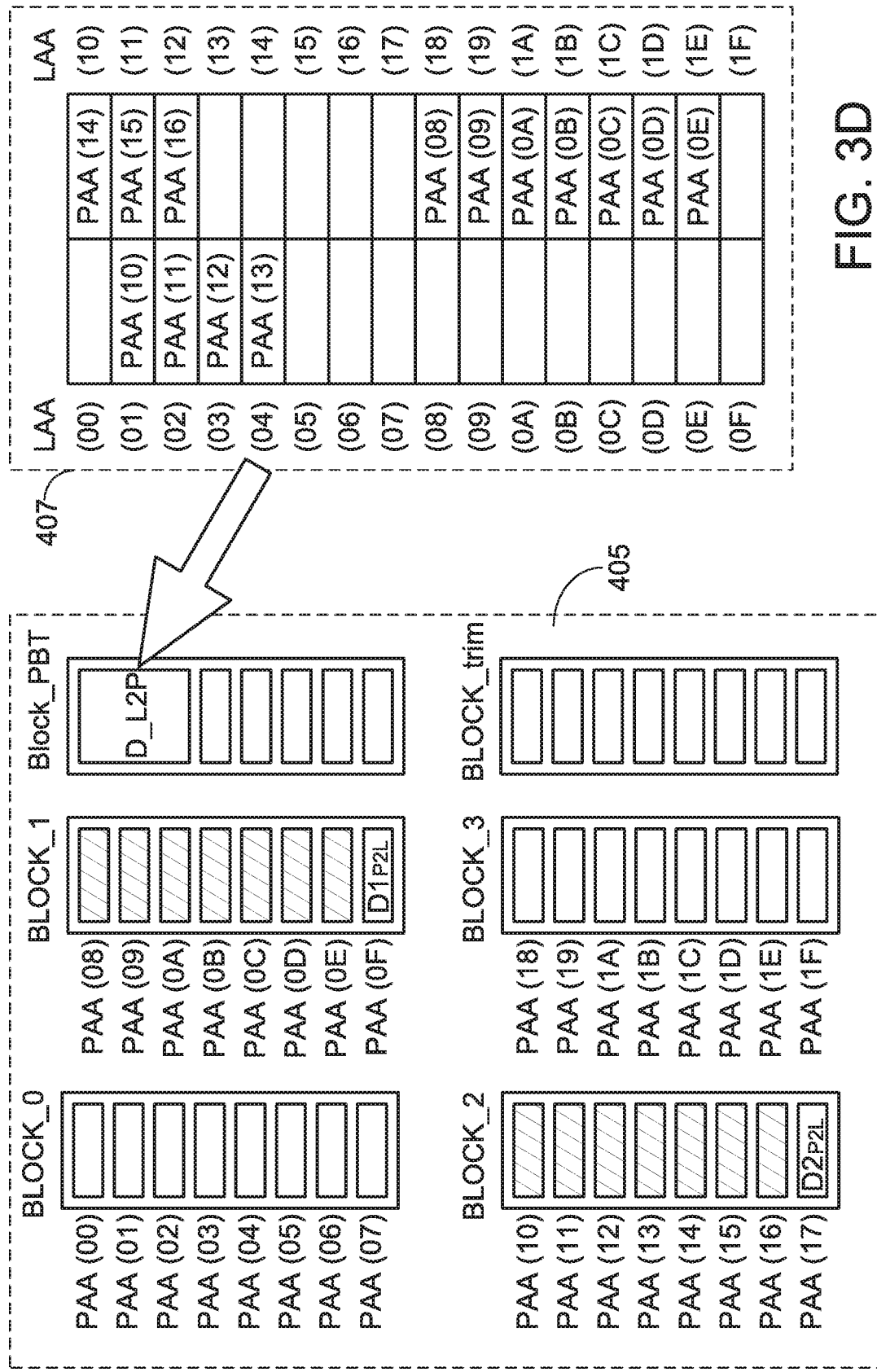
FIGS. 3D~3H schematically illustrate a method of performing a sudden power off and recovery (SPOR) action to rebuild the L2P table of the solid state drive.
Figure 3E:
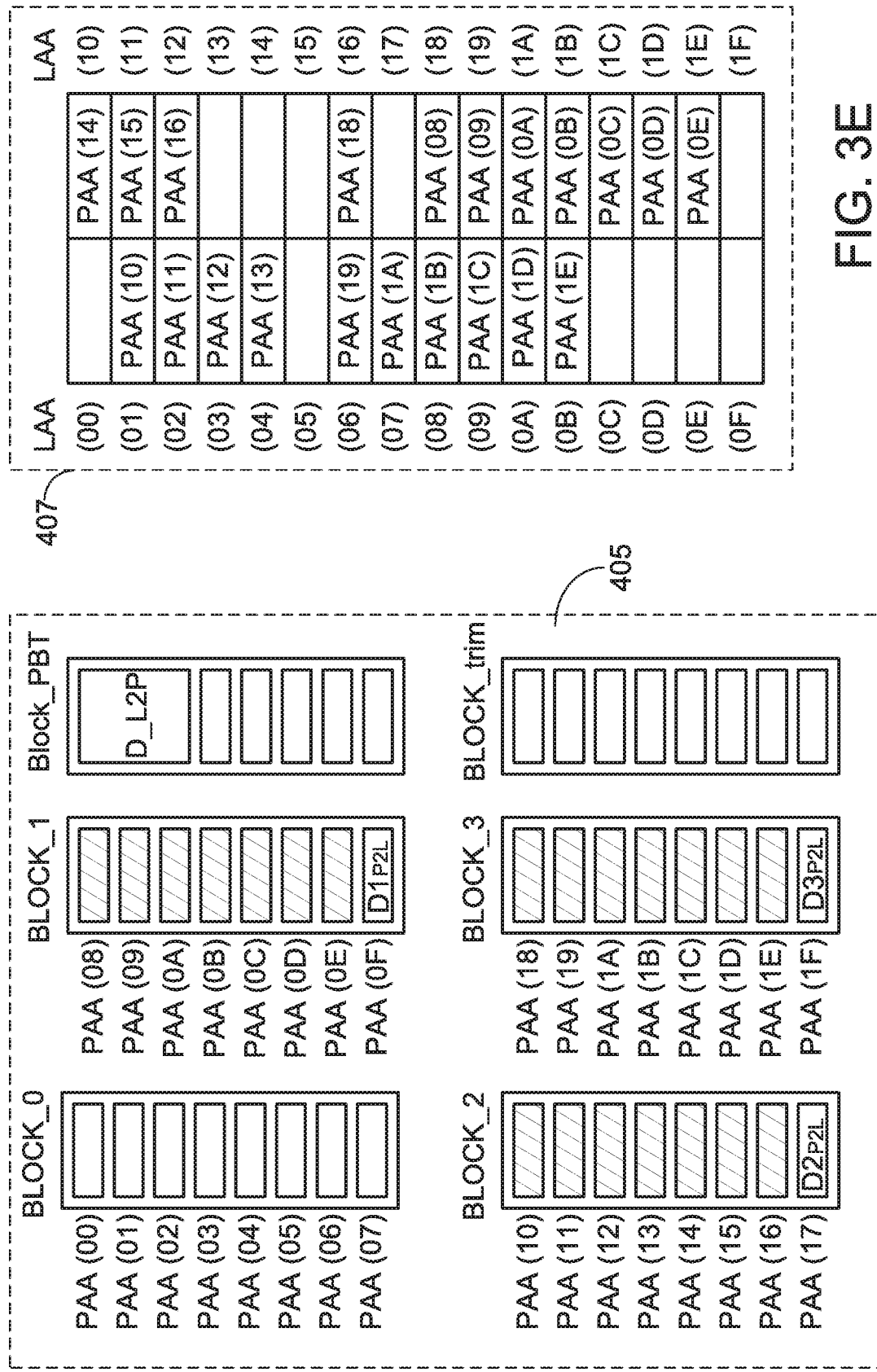

Please refer to FIG. 3E. After the backup action, the host 12 issues the write command again in order to store the write data into the locations corresponding to the logical allocation addresses LAA(16), LAA(06), LAA(07), LAA(08), LAA(09), LAA(0A) and LAA(0B). By the control circuit 401, the write data are stored into the physical allocation addresses PAA(18), PAA(19), PAA(1A), PAA(1B), PAA(1C), PAA(1D) and PAA(1E) of the third block Block_3 of the free blocks. That is, the write data are stored in the first page to the seventh page of the third block Block_3.

As shown in FIG. 3E, the write data are stored into the physical allocation addresses PAA(18), PAA(19), PAA(1A), PAA(1B), PAA(1C), PAA(1D) and PAA(1E) of the third block Block_3 (i.e., the regions marked with oblique lines). In addition, the relationships between LAAs and PAAs are stored in the L2P table 407 by the control circuit 401.

After the data area of the third block Block_3 is occupied, the control circuit 401 performs the block-closing action. The physical-to-logical data $D3_{P2L}$ of the third block Block_3 (i.e., the relationships between all PAAs of the third block Block_3 and the corresponding LAAs) are recorded in the last page (i.e., the information area) of the third block Block_3. After the block-closing action is completed, the third block Block_3 becomes a used block.

Figure 3F:
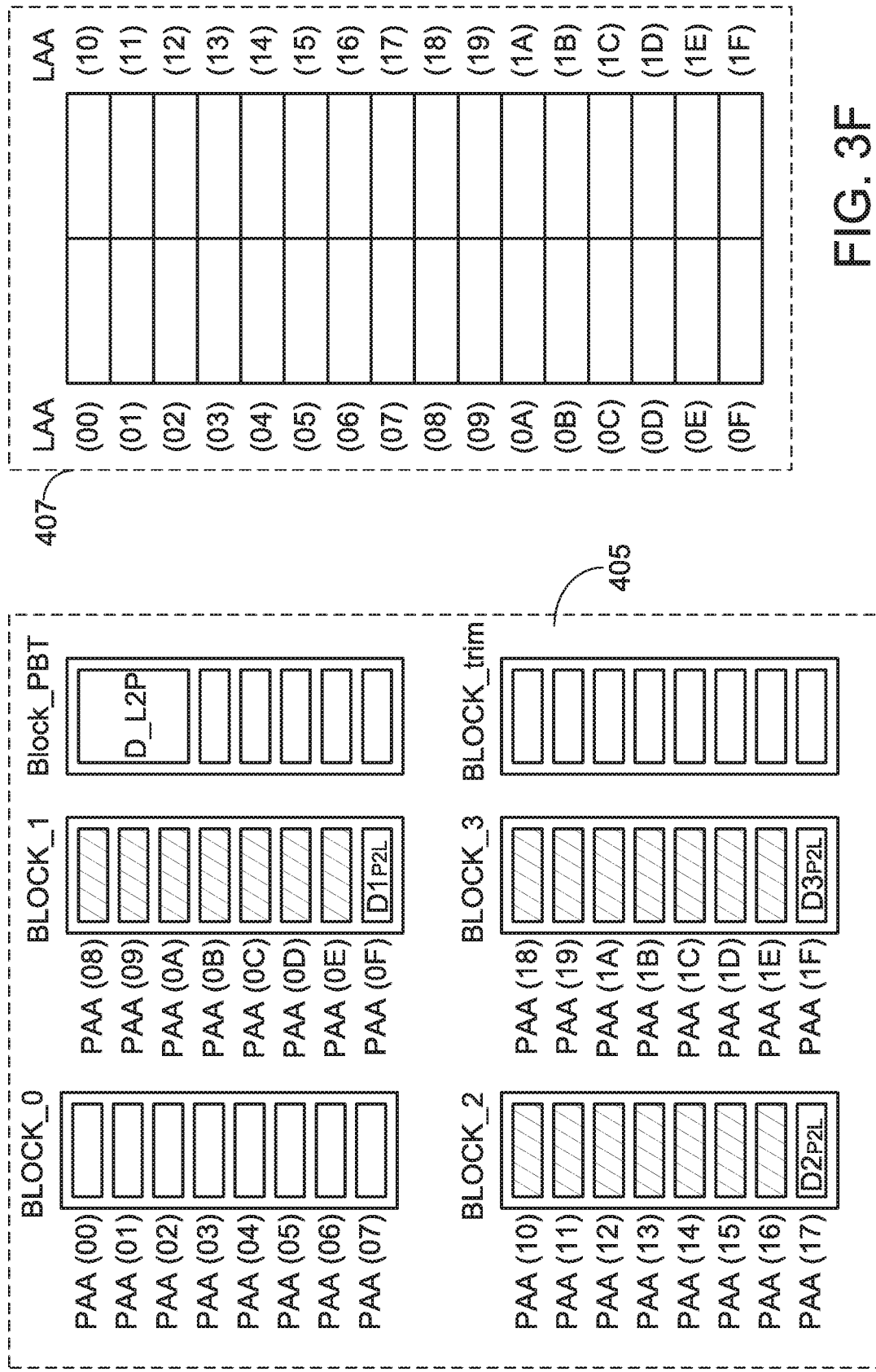

Please refer to FIG. 3F. In case that the electric power supplied to the solid state drive 40 is interrupted suddenly (i.e., a sudden power off event occurs), the contents of the L2P table 407 are lost. When the solid state drive 40 is powered on again, the solid state drive 40 performs a sudden power off and recovery (SPOR) action.

Figure 3G:
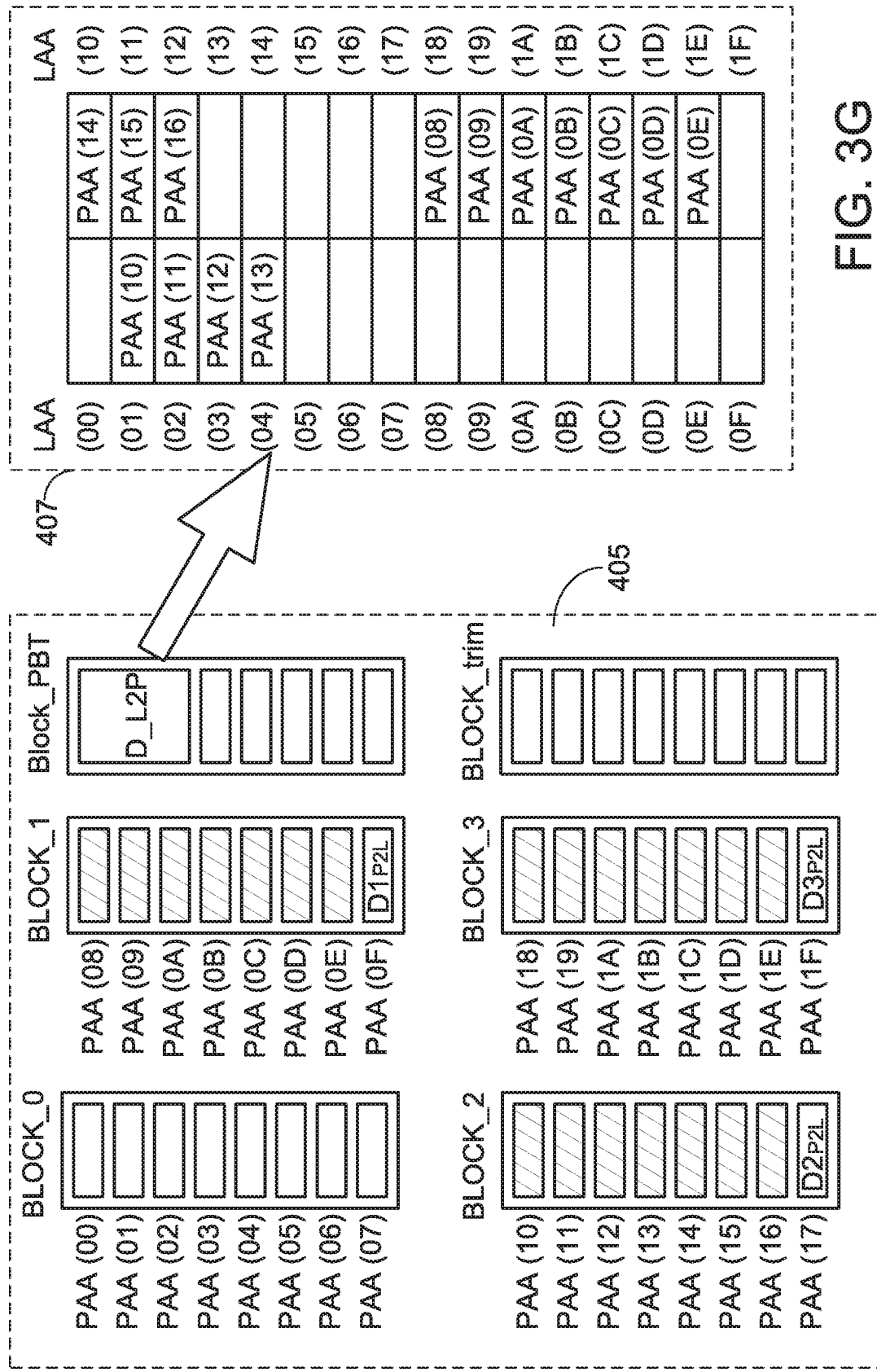

Please refer to FIG. 3G. The control circuit 401 acquires the latest contents D_L2P from the backup block Block_PBT of the non-volatile memory 405 and loads the latest contents D_L2P to the L2P table 407. Consequently, the control circuit 401 confirms that the first block Block_1 and the second block Block_2 are the used blocks.

Then, the control circuit 401 searches the other blocks of the non-volatile memory 405. Consequently, the control circuit 401 confirms that the third block Block_3 is the used block but no corresponding relationships are recorded in the L2P table 407. Then, please refer to FIG. 3H. The control circuit 401 acquires the physical-to-logical data $D3_{P2L}$ from the information region of the third block Block_3 and records the associated relationships into the L2P table 407.

Figure 3H:
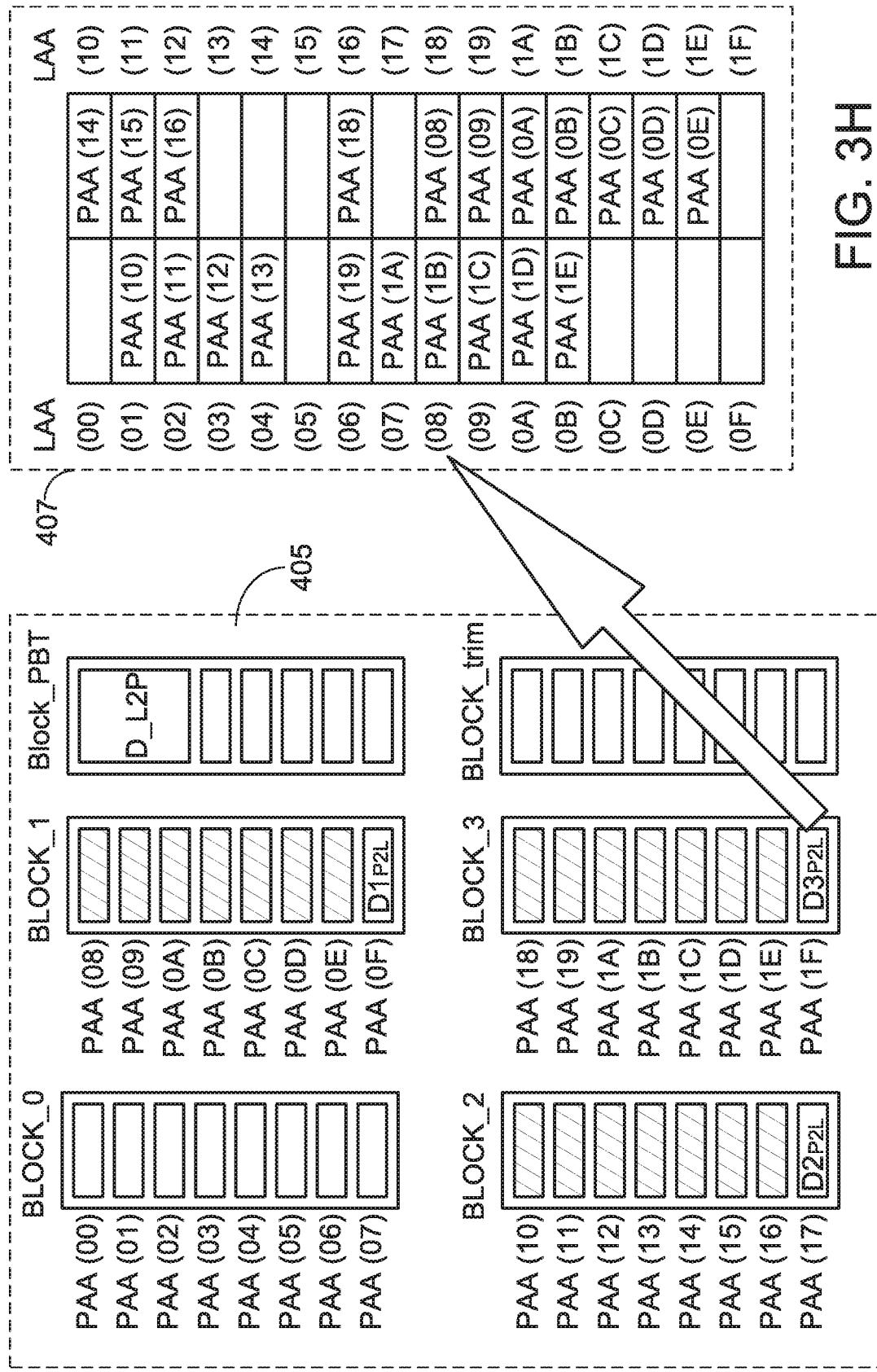

Please refer to FIG. 3H. The L2P table 407 is rebuilt. Consequently, the contents of the L2P table 407 are restored to the original contents before the sudden power off event occurs. That is, the SPOR action of the solid state drive 40 is completed. Consequently, the solid state drive 40 can be operated normally.

As mentioned above, if the trim command has been issued from the host to the control circuit after the backup action is completed and before the sudden power off event occurs, the addresses corresponding to the trim command will be lost. Since the addresses corresponding to the trim command are lost, the contents of the associated blocks cannot be successfully rebuilt. For solving this problem, the technology of the present invention is modified. If a used block is changed to an unused block while the control circuit 401 executes the trim command, the physical-to-logical data (also referred as the P2L-related data) of the close information in the unused block is stored into the trim block Block_trim.

Figure 4:
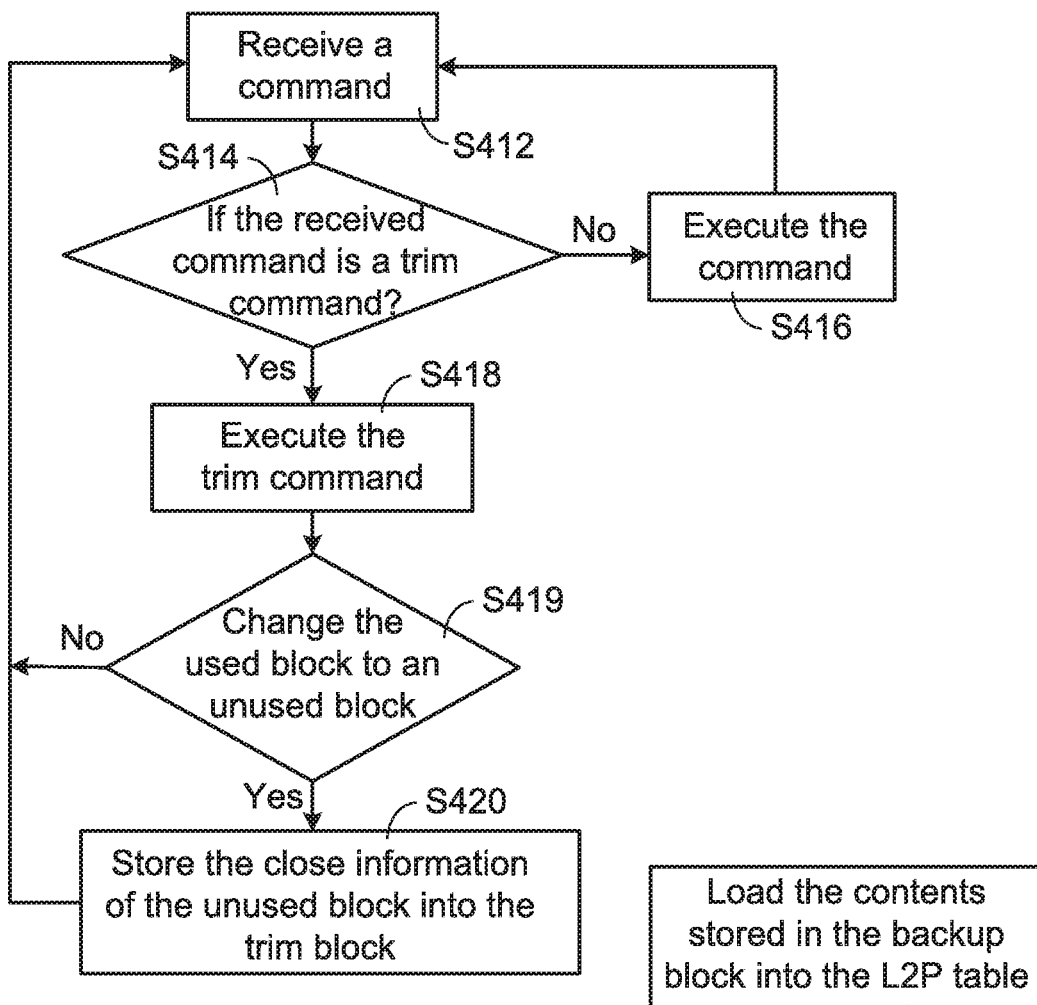
FIG. 4 is a flowchart illustrating a data processing method for a solid state drive according to an embodiment of the present invention.

FIG. 4 is a flowchart illustrating a data processing method for a solid state drive according to an embodiment of the present invention. When the solid state drive 40 is in a normal working state, the control circuit 401 receives a command from the host 12 (Step S412) and judges whether the received command is a trim command (Step S414). If the judging result of the step S414 indicates that the received command is not the trim command, the control circuit 401 executes the command (Step S416) and the step S412 is repeatedly done. For example, if the received command is a write command, the control circuit 401 stores the write data into the non-volatile memory 405 according to the write command. Alternatively, if the received command is a read command, the control circuit 401 transmits the read data from the non-volatile memory 405 to the host 12.

If the judging result of the step S414 indicates that the received command is the trim command, the control circuit 401 executes the trim command (Step S418). According to the trim command, the control circuit 401 performs a cancellation action on the corresponding logical-to-physical relationships of the L2P table 407.

After the step S418, the control circuit 401 judges whether any used block is changed to an unused block (Step S419). If the judging condition of the step S419 is not satisfied, the step S412 is repeatedly done. Whereas, if the judging condition of the step S419 is satisfied, the control circuit 401 stores the close information of the unused block into the trim block Block_trim (Step S420) and the step S412 is repeatedly done.

For example, if the write data in a used block all become to invalid data while the trim command is executed, the control circuit 401 confirms that the used block is changed to an unused block. Then, the control circuit 401 stores the P2L-related data of the close information of the unused block into the trim block Block_trim. Then, the control circuit 401 can perform an erase action on the unused block at a proper timing. After the erase action is completed, the unused block becomes a free block.

Figure 5:
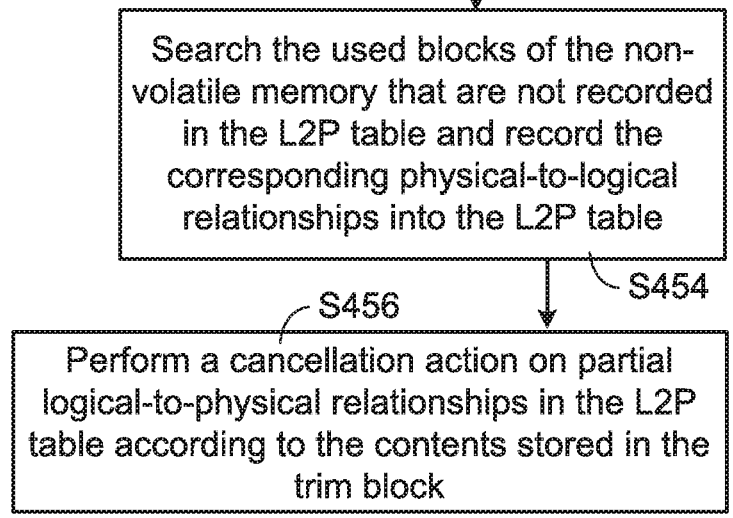
FIG. 5 is a flowchart illustrating a method of performing a sudden power off and recovery (SPOR) action to rebuild the L2P table of the solid state drive.

FIG. 5 is a flowchart illustrating a method of performing a sudden power off and recovery (SPOR) action to rebuild the L2P table of the solid state drive. When the sudden power off and recovery (SPOR) action is started, the backup contents of the L2P table stored in the backup block Block_PBT are loaded into the L2P table 407 by the control circuit 401 (Step S452). Then, the control circuit 401 searches the used blocks of the non-volatile memory 405 that are not recorded in the L2P table 407 and records the corresponding physical-to-logical relationships stored in the information areas of the used blocks into the L2P table 407 (Step S454). Then, the control circuit 401 performs a cancellation action on partial logical-to-physical relationships in the L2P table according to the contents stored in the trim block Block_trim (Step S456).

Figure 6A:
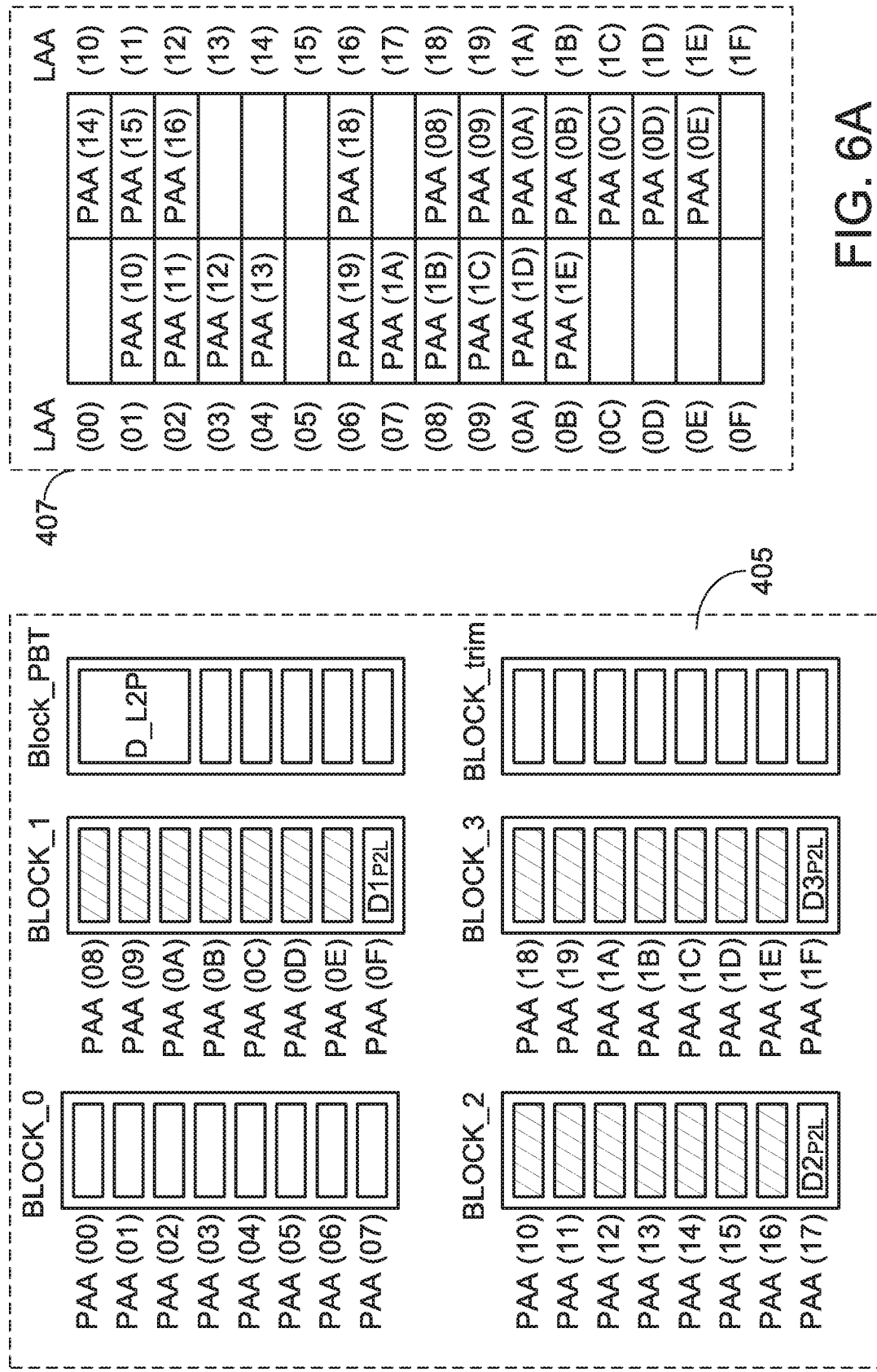
FIGS. 6A~6E schematically illustrate the operations of the solid state drive while the data processing method and the SPOR action are performed.

FIGS. 6A~6E schematically illustrate the operations of the solid state drive while the data processing method and the SPOR action are performed. The condition of the non-volatile memory 405 and the contents of the L2P table 407 as shown in FIG. 6A are similar to those as shown in FIG. 3E.

Figure 6B:
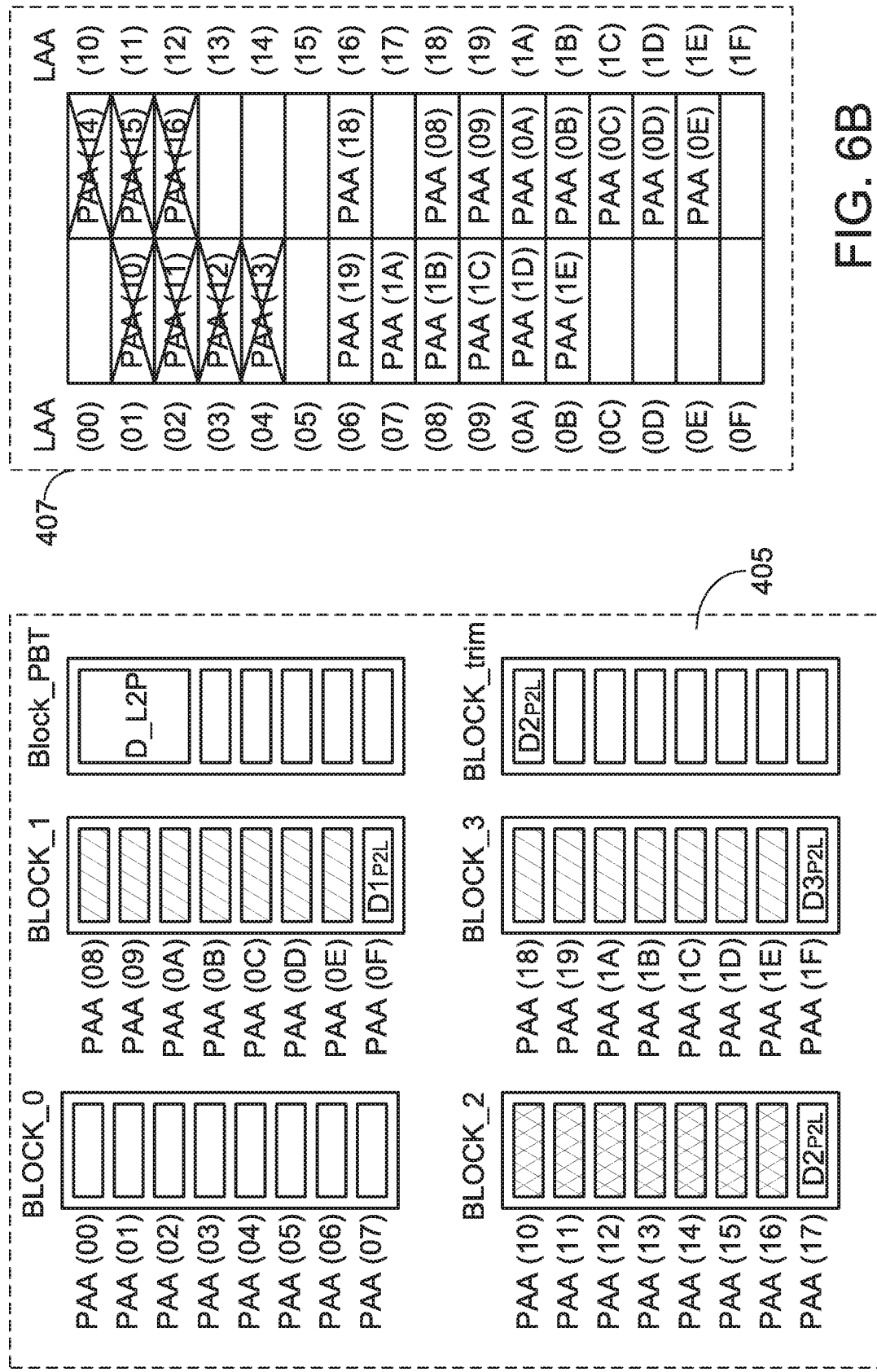

Please refer to FIG. 6B. The host 12 issues a trim command in order to delete the data in the locations corresponding to the logical allocation addresses LAA(01), LAA(02), LAA(03), LAA(04), LAA(10), LAA(11) and LAA(12).

Consequently, the control circuit 401 performs a cancellation action to cancel the relationships between the logical allocation addresses LAA(01), LAA(02), LAA(03), LAA(04), LAA(10), LAA(11), LAA(12) and the physical allocation addresses PAA(10), PAA(11), PAA(12), PAA(13), PAA(14), PAA(15) and PAA(16) in the L2P table 407. Meanwhile, all data in the second block Block_2 (i.e., the regions marked with cross lines) become to the invalid data. That is, the second block Block_2 is changed to the unused block.

After the control circuit 401 confirms that the second block Block_2 is changed to the unused block, the control circuit 401 stores the close information of the second block Block_2 (i.e., the physical-to-logical data $D2_{P2L}$) to the trim block Block_trim as shown in FIG. 6B. Then, the control circuit 401 can perform an erase action on the second block Block_2 at a proper timing. After the erase action is completed, the second block Block_2 becomes a free block.

If the sudden power off event of the solid state drive 40 occurs at this moment, the contents of the L2P table 407 are lost. When the solid state drive 40 is powered on again, the solid state drive 40 performs the SPOR action.

Figure 6C:
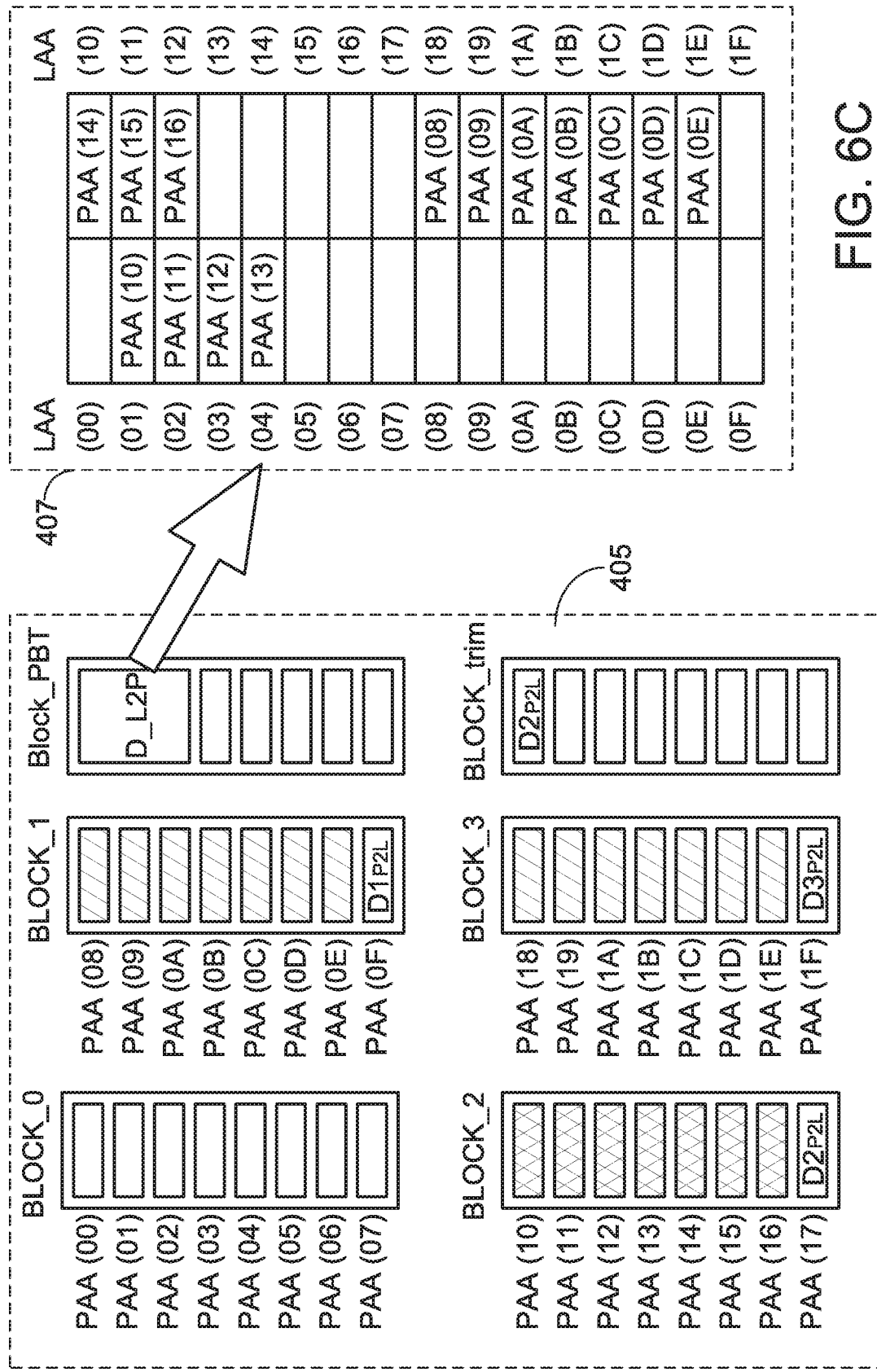
Figure 6D:
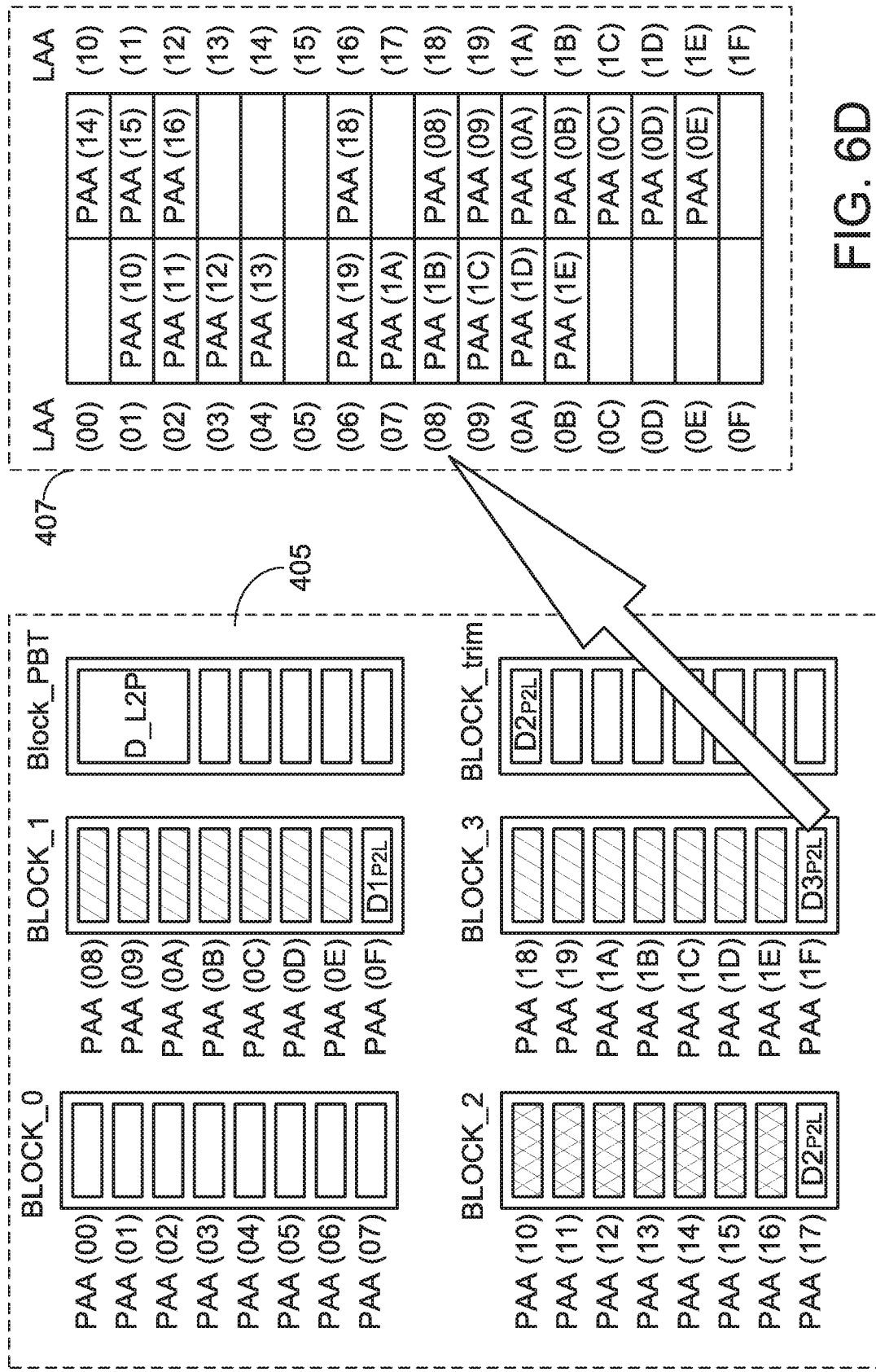

Please refer to FIG. 6C. The control circuit 401 acquires the latest contents D_L2P from the backup block Block_PBT of the non-volatile memory 405 and loads the latest contents D_L2P into the L2P table 407.

Then, the control circuit 401 searches other blocks of the non-volatile memory 405. Consequently, the control circuit 401 confirms that the third block Block_3 is the used block but no corresponding relationships are recorded in the L2P table 407. Then, please refer to FIG. 6D. The control circuit 401 acquires the physical-to-logical data $D3_{P2L}$ from the information region of the third block Block_3 and records the associated relationships into the L2P table 407.

Figure 6E:
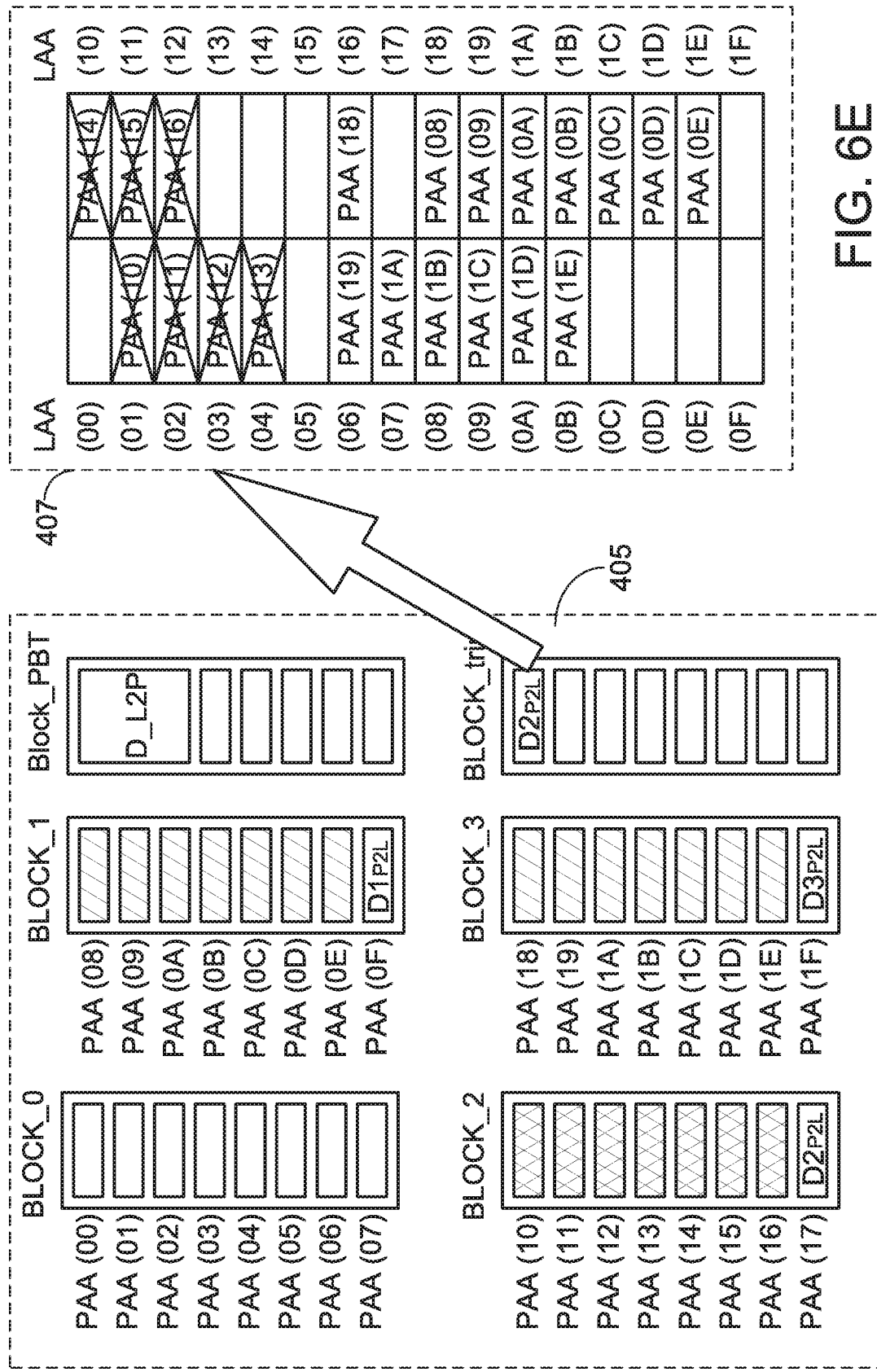

Please refer to FIG. 6E. As the physical-to-logical data $D2_{P2L}$ of the close information of the second block Block_2 is stored in the trim block Block_trim, the control circuit 401 confirms that the second block Block_2 is the unused block, the control circuit 401 cancels the logical-to-physical relationships corresponding to the second block Block_2 in the L2P table 407 according to the close information of the second block Block_2 (i.e., the physical-to-logical data $D2_{P2L}$) stored in the trim block Block_trim. That is, the control circuit 401 cancels the relationships between the logical allocation addresses LAA(01), LAA(02), LAA(03), LAA(04), LAA(10), LAA(11), LAA(12) and the physical allocation addresses PAA(10), PAA(11), PAA(12), PAA(13), PAA(14), PAA(15) and PAA(16) in the L2P table 407.

As mentioned above, if a used block is changed to an unused block while the control circuit 401 executes the trim command, the P2L-related data of the close information of the unused block is stored into the trim block Block_trim. Consequently, if the sudden power off event of the solid state drive 40 occurs and the solid state drive 40 is powered again, the sudden power off and recovery (SPOR) action is performed to rebuild the L2P table accurately. After the L2P table 407 is rebuilt, the contents of the L2P table 407 are restored to the original contents. Consequently, the solid state drive 40 can be operated normally.

In the above embodiments, the non-volatile memory 405 contains 6 blocks, and each block contains 8 pages. It is noted that the number of the blocks in the non-volatile memory and the number of the pages in each block are not restricted. In the above embodiments, the latest page of the block is used as the information area. It is noted that the example of the information area is not restricted.

In practice, the non-volatile memory 405 contains more blocks, and each block contains more pages. For example, the non-volatile memory 405 contains 1024 blocks, and each block contains 2000 pages. Moreover, the first page to the 1990th page of each block are defined as the data areas for storing the write data, and the 1991th page to the 2000th page of each block are defined as the information areas for storing the close information.

Moreover, if the non-volatile memory 405 is in the normal working state and the data amount of the write data reaches a specified data amount (e.g., 20 Gbytes), the control circuit 401 performs the backup action. Consequently, the updated contents of the L2P table 407 are stored into the backup block Block_PBT of the non-volatile memory 405.

The storage capacity of the trim block Block_trim is limited. If a storage amount of the trim block Block_trim reaches a threshold value, the control circuit 401 performs the backup action. Consequently, the updated contents of the L2P table 407 are stored into the backup block Block_PBT of the non-volatile memory 405. Then, the control circuit 401 performs an erase action on the trim block Block_trim. When the control circuit 401 executes the trim command again, the trim block Block_trim has a sufficient space for storing the P2L-related data of the close information of the unused blocks.

Generally, during the operation of the solid state drive 40, the control circuit 401 has performed the backup action many times and the plural write commands and plural trim commands from the host are executed.

Figure 7:
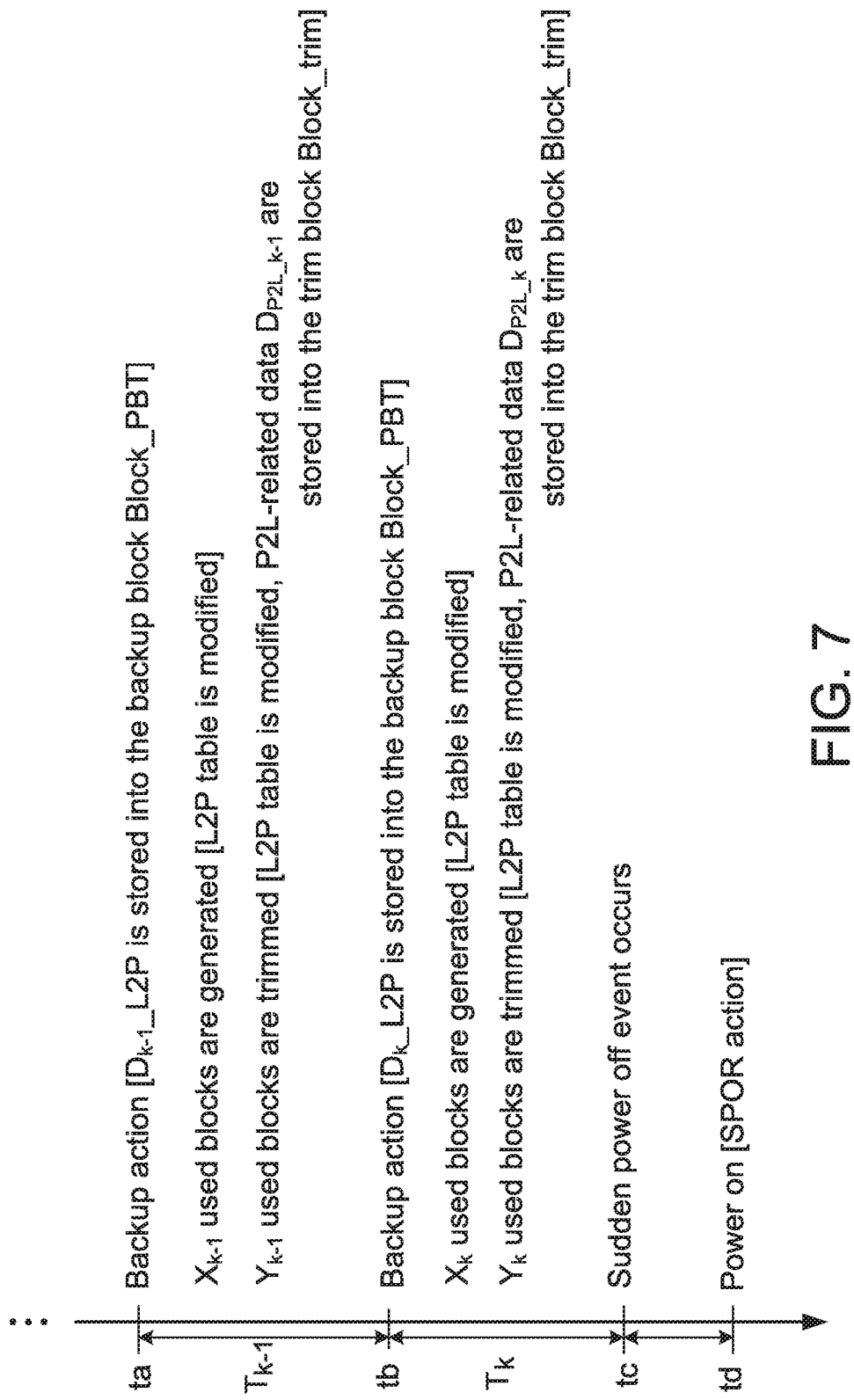
FIG. 7 schematically illustrates the relationships between the L2P table, the used blocks and the trim block during the operation of the solid state drive according to the embodiment of the present invention.

FIG. 7 schematically illustrates the relationships between the L2P table, the used blocks and the trim block during the operation of the solid state drive according to the embodiment of the present invention. For example, during the operation of the solid state drive 40, the control circuit 401 has performed the backup action for k times.

Please refer to FIG. 7. At the time point ta, the control circuit 401 performs the (k-1)-th backup action. Consequently, the L2P table content $D_{k-1}\_L2P$ is stored into the backup block Block_PBT. In other words, the L2P table content $D_{k-1}\_L2P$ stored in the backup block Block_PBT is the content of the L2P table 407 after the control circuit 401 performs the (k-1)-th backup action. As shown in FIG. 3D, the content of the L2P table 407 is copied to the backup block Block_PBT when the control circuit 401 performs the backup action.

In the time interval $T_{k-1}$ between the time point ta and the time point tb, the control circuit 401 executes a write command and stores the write data into the blocks of the non-volatile memory 405. After a block-closing action is completed, $X_{k-1}$ used blocks are newly generated. Similarly, while the control circuit 401 stores the write data into the $X_{k-1}$ used blocks, the content of the L2P table 407 is synchronously modified. The time interval $T_{k-1}$ is the time interval between the time point of performing the (k-1)-th backup action and the time point of performing the next (i.e., the k-th) backup action.

In the time interval $T_{k-1}$ between the time point ta and the time point tb, the control circuit 401 also executes a trim command to change $Y_{k-1}$ blocks to unused blocks. Similarly, while the control circuit 401 executes the trim command, the content of the L2P table 407 is synchronously modified by the control circuit 401 and the logical-to-physical relationships of the L2P table 407 corresponding to the $Y_{k-1}$ blocks are cancelled. Moreover, all P2L-related data $D_{P2L\_k-1}$ of the close information in the unused block $Y_{k-1}$ blocks are stored into the trim block Block_trim by the control circuit 401. For example, please refer to FIG. 6B. After the trim command is executed, the logical-to-physical relationship of the L2P table 407 corresponding to the second block Block_2 is cancelled by the control circuit 401 and the P2L-related data $D2_{P2L}$ of the second block Block_2 is stored into the trim block Block_trim.

The sequence of executing the write command and the trim command by the control circuit 401 is not restricted. Generally, the commands are sequentially executed by the control circuit 401 according to the sequence of the commands issued from the host 12. Moreover, while the control circuit 401 executes the read command, the content of the L2P table 407 is not changed. Consequently, the method of executing the read command is not described in FIG. 7.

At the time point tb, the control circuit 401 performs the k-th backup action. Consequently, the L2P table content $D_k\_L2P$ is stored into the backup block Block_PBT. In other words, the L2P table content $D_k\_L2P$ stored in the backup block Block_PBT is the content of the L2P table 407 after the control circuit 401 performs the k-th backup action.

In the time interval $T_k$ between the time point tb and the time point tc, the control circuit 401 executes a write command and stores the write data into the blocks of the non-volatile memory 405. After a block-closing action is completed, $X_k$ used blocks are newly generated. Similarly, while the control circuit 401 stores the write data into the $X_k$ used blocks, the content of the L2P table 407 is synchronously modified. The time interval $T_k$ is the time interval between the time point of performing the k-th backup action and the occurrence time point of the sudden power off event.

In the time interval $T_k$ between the time point tb and the time point tc, the control circuit 401 also executes a trim command to change $Y_k$ blocks to unused blocks. Similarly, while the control circuit 401 executes the trim command, the content of the L2P table 407 is synchronously modified by the control circuit 401 and the logical-to-physical relationships of the L2P table 407 corresponding to the $Y_k$ blocks are cancelled. Moreover, all P2L-related data $D_{P2L\_k}$ of the close information in the unused block $Y_k$ blocks are stored into the trim block Block_trim by the control circuit 401.

At the time point tc, the electric power supplied to the solid state drive 40 is interrupted suddenly. That is, a sudden power off event occurs, and the contents of the L2P table 407 are lost. At the time point td when the solid state drive 40 is powered on again, the solid state drive 40 performs a sudden power off and recovery (SPOR) action. Consequently, the contents of the L2P table 407 are restored to the original contents before the sudden power off event occurs.

In an embodiment, the control circuit 401 performs the sudden power off and recovery (SPOR) action of FIG. 5 to rebuild the L2P table 407. When the sudden power off and recovery (SPOR) action is started, the latest L2P table content $D_k\_L2P$ stored in the backup block Block_PBT is loaded into the L2P table by the control circuit 401. Then, the control circuit 401 searches the used blocks of the non-volatile memory 405 that are not recorded in the L2P table 407, i.e., the $X_k$ used blocks generated in the time interval $T_k$. Moreover, the physical-to-logical relationships stored in the information areas of the used blocks $X_k$ are recorded into the L2P table 407. Then, the control circuit 401 performs a cancellation action on partial logical-to-physical relationships in the L2P table 407 according to the latest P2L-related data $D_{P2L\_k}$ stored in the trim block Block_trim. After the L2P table 407 is rebuilt, the solid state drive 40 enters the normal working state.

As mentioned above, while the SPOR action is performed, the control circuit 401 starts to rebuild the L2P table 407 according to the L2P table content $D_k\_L2P$ that is stored in the backup block Block_PBT through the latest (i.e., the k-th) backup action. If the L2P table content $D_k\_L2P$ stored in the backup block Block_PBT cannot be successfully read by the control circuit 401, the SPOR action fails. Consequently, the L2P table 407 cannot be rebuilt.

For preventing from the failure of the POR action, the method of performing the SPOR action is modified. In another embodiment, the control circuit 401 starts to rebuild the L2P table 407 according to the earlier L2P table contents stored in the backup block Block_PBT.

Figure 8:
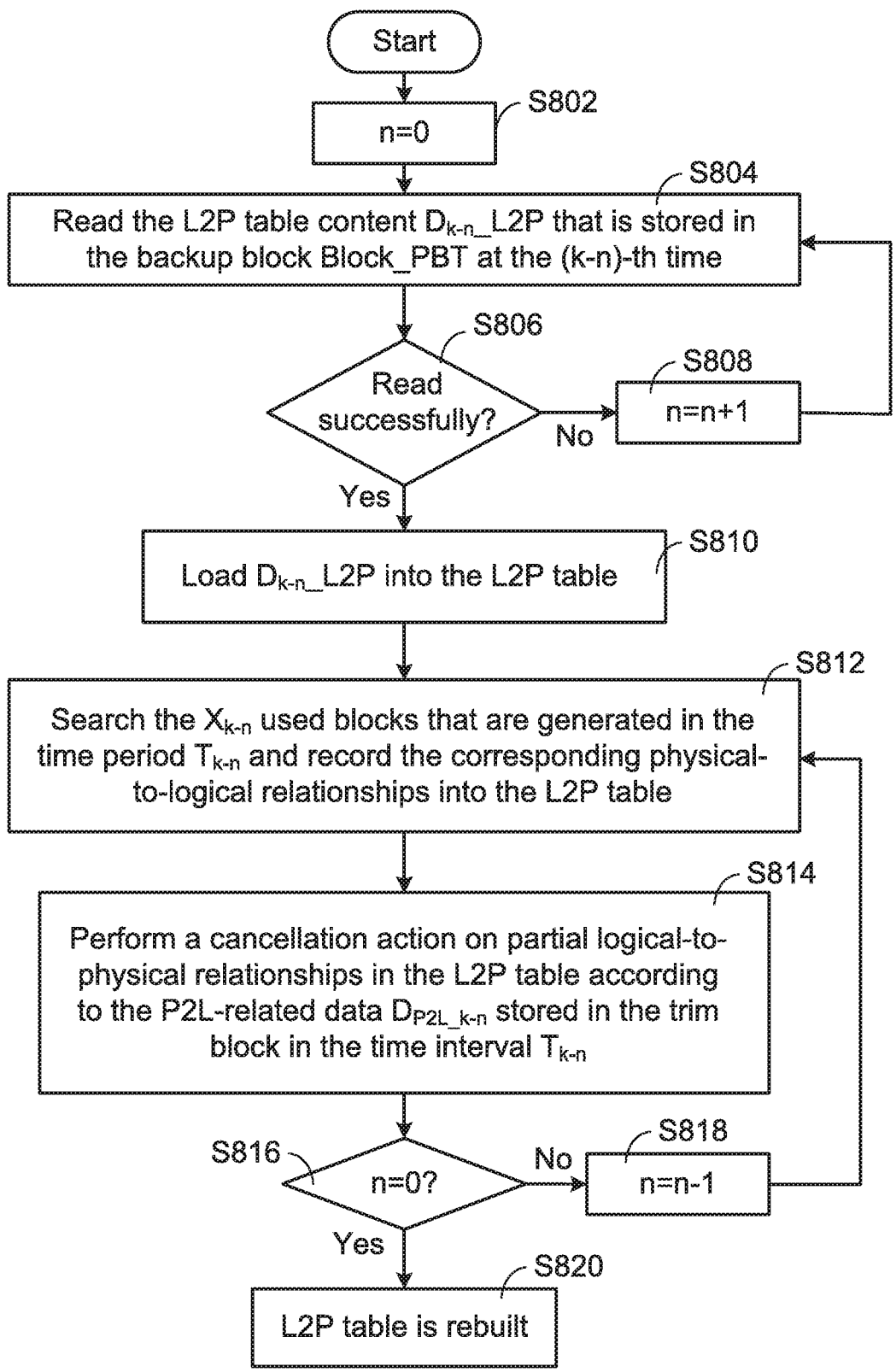
FIG. 8 is a flowchart illustrating another method of performing a sudden power off and recovery (SPOR) action to rebuild the L2P table of the solid state drive.

FIG. 8 is a flowchart illustrating another method of performing a sudden power off and recovery (SPOR) action to rebuild the L2P table of the solid state drive. For example, during the operation of the solid state drive 40, the control circuit 401 has performed the backup action k times. Consequently, k contents of the L2P table 407 (i.e., the L2P table contents $D_1\_L2P \sim D_k\_L2P$) have been stored in the backup block Block_PBT. Similarly, k P2L-related data $D_{P2L\_1} \sim D_{P2L\_k}$ acquired in the time intervals $T_1 \sim T_k$ have been stored in the trim block Block_trim.

The method of performing the SPOR action will be described as follows.

Firstly, the control circuit 401 sets n=0 (Step 802) and reads the L2P table content $D_{k-n}\_L2P$ that is stored in the backup block Block_PBT at the (k-n)-th time (Step S804). If the L2P table content $D_{k-n}\_L2P$ stored at the (k-n)-th time is not successfully read (Step S806), the control circuit 401 sets n=n+1 (Step S808) and the step S804 is repeatedly done.

According to the above process from the step S802 to S808, the method of the present invention has the following features. While the SPOR action of the solid state drive 40 is performed, the control circuit 401 firstly reads the latest (i.e., the k-th) L2P table content from the backup block Block_PBT and then sequentially reads the earlier-stored L2P table contents from the backup block Block_PBT in a reverse order. Until one of the L2P table contents stored in the backup block Block_PBT is successfully read, the next step is performed.

If the L2P table content $D_{k-n}\_L2P$ stored at the (k-n)-th time is successfully read (Step S806), the L2P table content $D_{k-n}\_L2P$ stored in the backup block Block_PBT at the (k-n)-th time is loaded into the L2P table 407 by the control circuit 401 (Step S810).

Then, the control unit 401 searches the $X_{k-n}$ used blocks that are generated in the time interval $T_{k-n}$ and records the corresponding physical-to-logical relationships that are stored in the information areas of the $X_{k-n}$ used blocks into the L2P table 407 (Step S812).

Then, the control circuit 401 performs a cancellation action on partial logical-to-physical relationships in the L2P table 407 according to the P2L-related data $D_{P2L\_k-n}$ stored in the trim block Block_trim in the time interval $T_{k-n}$ (Step S814).

Then, the control circuit 401 judges whether n=0 (Step S816). If n is not 0, the control circuit 401 sets n=n-1 (Step S818) and the step S812 is repeatedly done. Whereas, if n=0, the L2P table 407 is rebuilt (Step S820). Meanwhile, the solid state drive 40 enters the normal working state.

A method of performing the SPOR action will be illustrated with reference to FIG. 7. It is presumed that the control circuit 401 cannot read the latest (i.e., the k-th) L2P table content $D_k\_L2P$ from the backup block Block_PBT while the SPOR action is performed. It is also presumed that the control circuit 401 is only able to read the second last (i.e., the (k-1)-th) L2P table content $D_{k-1}\_L2P$ from the backup block Block_PBT while the SPOR action is performed. Consequently, when n=1, the L2P table content $D_{k-1}\_L2P$ stored at the (k-1)-th time can be successfully read by the control circuit 401.

Then, the L2P table content $D_{k-1}\_L2P$ stored in the backup block Block_PBT at the (k-1)-th time is loaded into the L2P table 407 by the control circuit 401. Then, the control unit 401 searches the $X_{k-1}$ used blocks that are generated in the time interval $T_{k-1}$ and records the corresponding physical-to-logical relationships that are stored in the information areas of the $X_{k-1}$ used blocks into the L2P table 407. Then, the control circuit 401 performs a cancellation action on partial logical-to-physical relationships in the L2P table 407 according to the P2L-related data $D_{P2L\_k-1}$ stored in the trim block Block_trim in the time interval $T_{k-1}$.

As mentioned above, the control circuit 401 cannot read the latest (i.e., the k-th) L2P table content $D_k\_L2P$ from the backup block Block_PBT. However, after the above flowchart is completed, the content of the L2P table 407 is identical to the latest (i.e., the k-th) L2P table content $D_k\_L2P$ in the backup block Block_PBT. In other words, the control circuit 401 can derive the latest (i.e., the k-th) L2P table content $D_k\_L2P$ in the backup block Block_PBT according to the second last (i.e., the (k-1)-th) L2P table content $D_{k-1}\_L2P$ in the backup block Block_PBT.

That is, according to the L2P table content $D_{k-n}\_L2P$ stored in the backup block Block_PBT at the (k-n)-th time, the control circuit 401 can derive L2P table content $D_{k-n+1}\_L2P$ that is stored in the backup block Block_PBT at the next time, i.e., the (k-n+1)-th time.

After the latest (i.e., the k-th) L2P table content $D_k\_L2P$ is derived, the value of n is successively decreased. Consequently, n=0. Then, the control unit 401 searches the $X_k$ used blocks that are generated in the time interval $T_k$ and records the corresponding physical-to-logical relationships that are stored in the information areas of the $X_k$ used blocks into the L2P table 407. Then, the control circuit 401 performs a cancellation action on partial logical-to-physical relationships in the L2P table 407 according to the P2L-related data $D_{P2L\_k}$ stored in the trim block Block_trim in the time interval $T_k$. Whereas, the L2P table 407 is rebuilt. Meanwhile, the solid state drive 40 enters the normal working state.

From the above descriptions of FIG. 8, the implementation of the SPOR action is capable of successfully rebuilding the L2P table 407 as long as one of plural L2P table contents stored in the backup block Block_PBT at plural time points is successfully read. Consequently, the probability of successfully rebuilding the L2P table 407 is largely increased.

As mentioned above, the storage capacities of the backup block Block_PBT and the trim block Block_trim are limited. According to the present invention, the L2P table contents obtained at the last two backup actions (or more backup actions) are retained in the backup block Block_PBT. Similarly, the P2L-related data obtained at the last two backup actions(or more backup actions) are retained in the trim block Block_trim. In some other embodiments, more contents are retained in the backup block Block_PBT and the trim block Block_trim.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data processing method for a solid state drive, the solid state drive comprising a control circuit and a non-volatile memory, the control circuit comprising a logical-to-physical table, the non-volatile memory comprising plural blocks, the data processing method comprising steps of:

when a write command is received, executing the write command to store a write data into at least one of the plural blocks, and updating the logical-to-physical table, wherein if a data area of a first block is occupied according to the write command, a block-closing action is performed to change the first block to a first used block, wherein, according to the block-closing action performed on the first block, a first close information including a first physical-to-logical data corresponding to the first block is generated and is stored in the first used block;

when a trim command is received, executing the trim command, and updating the logical-to-physical table, wherein if the first used block is changed to a first unused block according to the trim command, the first physical-to-logical data that is stored in the first used block is stored into a trim block;

performing a backup action at plural time points, wherein when the backup action is performed at one of the plural time points, a current content of the logical-to-physical table corresponding to the one of the plural time points is stored into the non-volatile memory, wherein plural backup contents of the logical-to-physical table corresponding to the plural time points respectively are stored in the non-volatile memory after the backup action is performed at the plural time points.

2. The data processing method as claimed in claim 1, further comprising steps of:

after a sudden power off event occurs and then the solid state drive is powered on, sequentially reading the plural backup contents of the logical-to-physical table from the non-volatile memory according to the plural time points in a reverse order until one of the plural backup contents is successfully read;

loading the successfully-read backup content into the logical-to-physical table, wherein the successfully-read backup content is corresponding to a corresponding time point of the plural time points;

searching a first number of used blocks that are generated in response to the write command after the corresponding time point, and recording a physical-to-logical relationship of the first number of used blocks into the logical-to-physical table; and searching a second number of physical-to-logical data that is stored in the trim block in response to the trim command after the corresponding time point, and cancelling a portion of the logical-to-physical relationship in the logical-to-physical table according to the second number of physical-to-logical data that is stored in the trim block in response to the trim command after the corresponding time point.

3. The data processing method as claimed in claim 1, further comprising steps of:

when a storage amount of the trim block reaches a threshold value, performing the backup action; and performing an erase action on the trim block.

4. The data processing method as claimed in claim 1, wherein at least one of the plural blocks is configured as the trim block, wherein the trim block is used for storing a close information but not for storing the write data.

* * * * *